United States Patent
Gretz

(10) Patent No.: US 8,063,302 B1
(45) Date of Patent: Nov. 22, 2011

(54) ELECTRICAL MOUNTING DEVICE FRONT WITH PLATE AND RETRACTABLE CLAMP ARMS FOR RAPID MOUNTING USING HOLE SAW

(75) Inventor: Thomas J. Gretz, Clarks Summit, PA (US)

(73) Assignee: Arlington Industries, Inc., Scranton, PA (US)

(*) Notice: Subject to any disclaimer, the term of this patent is extended or adjusted under 35 U.S.C. 154(b) by 490 days.

(21) Appl. No.: 12/319,648

(22) Filed: Jan. 9, 2009

Related U.S. Application Data

(63) Continuation-in-part of application No. 12/012,907, filed on Feb. 6, 2008, now Pat. No. 7,759,576, and a continuation-in-part of application No. 12/008,120, filed on Jan. 9, 2008, now Pat. No. 7,586,039.

(51) Int. Cl.
*H01H 9/02* (2006.01)

(52) U.S. Cl. ............ 174/58; 174/480; 174/481; 174/57; 220/3.2; 220/3.3; 248/906

(58) Field of Classification Search .................. 174/480, 174/481, 50, 53, 57, 58, 66, 63, 67; 220/3.2–3.9, 220/241, 242; 248/906; 439/535, 536
See application file for complete search history.

(56) References Cited

U.S. PATENT DOCUMENTS

| | | | |
|---|---|---|---|
| 4,304,957 A * | 12/1981 | Slater et al. ..................... | 174/58 |
| 4,328,903 A | 5/1982 | Baars | |
| 5,434,359 A * | 7/1995 | Schnell ........................... | 174/58 |
| 6,102,360 A | 8/2000 | Clegg et al. | |
| 6,346,674 B1 | 2/2002 | Gretz | |
| 6,508,445 B1 | 1/2003 | Rohmer | |
| 6,573,446 B1 * | 6/2003 | Umstead et al. ................ | 174/50 |
| 6,717,050 B2 * | 4/2004 | Laflamme et al. ............. | 174/50 |
| 7,186,916 B2 | 3/2007 | Jacks | |
| 7,300,025 B2 * | 11/2007 | Korcz .......................... | 248/906 |
| 7,557,308 B2 * | 7/2009 | Dinh ............................. | 174/481 |
| 7,897,870 B1 * | 3/2011 | Gretz ............................. | 174/58 |

* cited by examiner

*Primary Examiner* — Angel R Estrada

(57) ABSTRACT

An electrical mounting device for securing an electrical component or fixture on a wall. The mounting device includes a front plate with an opening therein and a rearward extending portion surrounding the opening. The rearward extending portion may be in the form of a peripheral wall with an open back or a peripheral wall with a rear wall defining an enclosure therein. Bosses with oversize apertures are provided in the plate for accommodating mounting fasteners. Clamp arms are secured rigidly to the ends of the mounting fasteners. The peripheral wall is dimensioned slightly less than the diameter of a standard size hole-saw. The clamp arms can be adjusted to a retracted position for insertion on a wall or to an extended position for securing the electrical mounting device to a wall. The electrical mounting device significantly reduces the time required for mounting an electrical component on a wall.

17 Claims, 16 Drawing Sheets

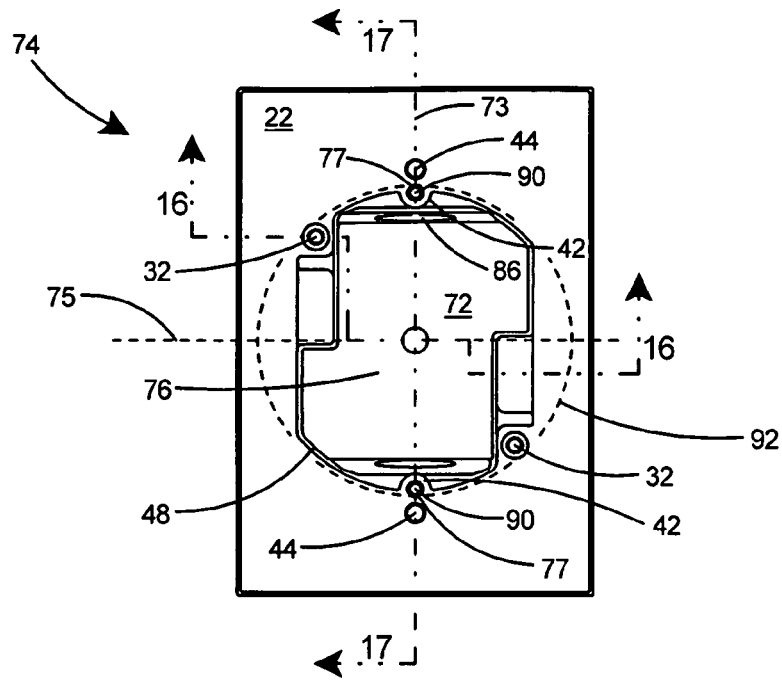
Fig. 15
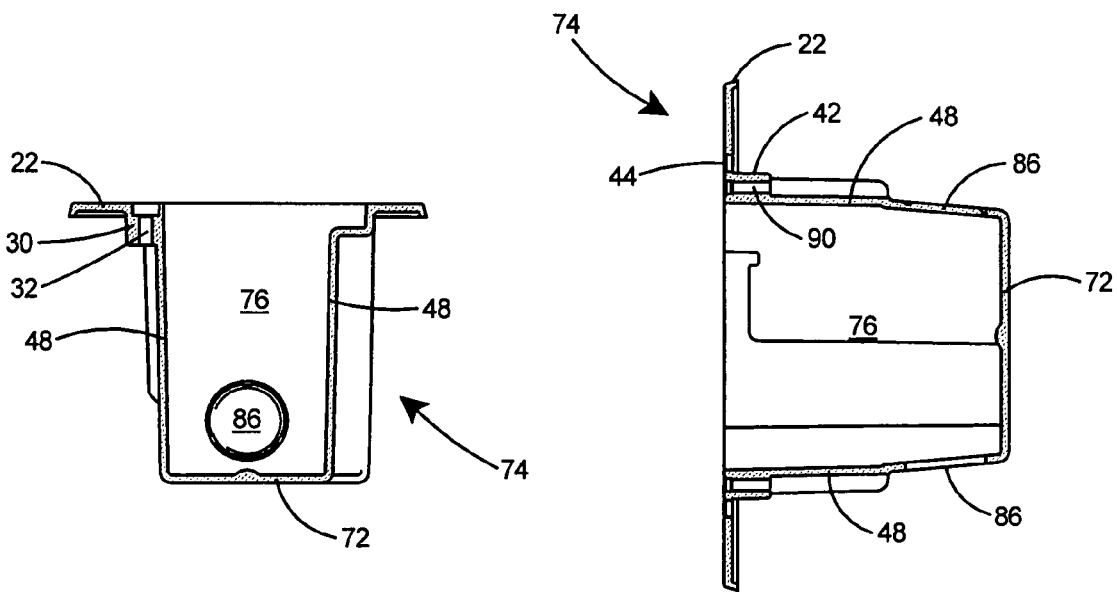
Fig. 16
Fig. 17

ELECTRICAL MOUNTING DEVICE FRONT WITH PLATE AND RETRACTABLE CLAMP ARMS FOR RAPID MOUNTING USING HOLE SAW

This application is a Continuation-In-Part of U.S. patent application Ser. No. 12/012,907 filed Feb. 6, 2008 and now U.S. Pat. No. 7,759,576, and is a Continuation-In-Part of U.S. patent application Ser. No. 12/008,120 filed Jan. 9, 2008 and now U.S. Pat. No. 7,586,039, the entire contents of which are incorporated herein by reference.

FIELD OF THE INVENTION

This invention relates to electrical boxes for mounting a high or low voltage electrical component or light fixture to a wall and specifically to an electrical box or frame member with retractable clamp arms for rapid mounting to a wall through a round aperture.

BACKGROUND OF THE INVENTION

To improve the lighting or electrical services in their homes, homeowners frequently retrofit their homes with additional electrical devices or light fixtures. Typically this is done by locating an appropriate stud, removing the sheetrock, and installing a standard electrical box or frame member that is secured to the studs with fasteners. This method typically involves replacing or repairing a substantial amount of sheetrock around the newly installed electrical box.

An alternative method includes an electrical box or frame member with flip out arms. In this method, a hole is made in the sheetrock and the electrical box or frame member is pushed through the hole. The hole in the sheetrock must typically be made larger than the box or frame member in order to accommodate the flip out arms as they are passed through the wall. After passing through the sheetrock, the arms are rotated outwards from the box or frame member and fasteners tightened to draw the clamps and box tight against the sheetrock. One problem with this method is that the homeowner must make a hole large enough to accommodate the flip out clamps that extend outward from the sidewalls of the electrical box. Typically the electrician makes a hole with a knife or saw and then enlarges the hole around the perimeter to accommodate each of the clamps. Mounting a conventional box or conventional frame member with rotatable arms therefore typically takes anywhere from 10 to 12 minutes. Given the rates charged by qualified electricians, this excessive installation time can make the installation of additional electrical services very expensive.

What is needed is an inexpensive, mechanically simple electrical box or frame member that can be quickly installed on a wall with minimal effort. Installation of the box should require only a standard size hole-saw for preparing the wall for the box or frame member.

SUMMARY OF THE INVENTION

The invention is an electrical mounting device for securing an electrical device or fixture to a wall. The electrical mounting device includes a front plate having a front surface, a rear surface, an opening, and a rearward extending portion surrounding the opening and extending from the rear surface of the plate. The rearward extending portion may be in the form of a peripheral wall with an open back or a peripheral wall terminating in a rear wall. Bosses with oversize holes are provided in the plate adjacent the opening for accommodating mounting fasteners. The mounting fasteners include heads accessible from the front of the plate and clamp arms secured rigidly to the ends of the fasteners. The peripheral wall is substantially round and includes a diameter that is slightly less than the diameter of a standard size hole-saw. The clamp arms can be rotated to either an inward position or an outward position. The peripheral wall is provided with open areas or recesses to fully accommodate the clamp arms when rotated to the inward position thereby enabling the peripheral wall and clamp arms to pass easily within the wall opening created by the standard size hole-saw.

OBJECTS AND ADVANTAGES

Several advantages are achieved with the electrical mounting device of the present invention, including:
(1) The electrical mounting device can be used to rapidly mount an electrical device or fixture on a wall.
(2) Wall preparation time is minimal as only a simple circular hole created by a standard size hole-saw is required in the drywall for mounting the electrical mounting device of the present invention to the wall.
(3) All the hardware for securing an electrical component to the wall is included with the electrical mounting device.
(4) The electrical mounting device can be easily installed on a wall with minimal prep work as the assembly is simply pressed into a circular hole that is easily made with a hole-saw.
(5) The electrical mounting device includes openings or recesses to enable the clamp arms to retract completely within the profile of the rearward extending peripheral wall thereby enabling the clamp arms to fit within the circular opening created by the hole-saw.
(6) The electrical mounting device enables the mounting of conventional electrical components, such as duplex receptacles that are substantially rectangular-shaped, with minimal wall preparation consisting of a simple circular hole in a wall.
(7) All portions of the rearward extending sidewall of the electrical mounting device are sized to fit easily through a circular hole created by a standard sized hole-saw.
(8) The electrical mounting device of the present invention significantly reduces the amount of time required for mounting an electrical device to a wall.

These and other objects and advantages of the present invention will be better understood by reading the following description along with reference to the drawings.

DESCRIPTION OF THE DRAWINGS

FIG. 15 is a front view of the box member.

FIG. 16 is a sectional view of the box member taken along line 16-16 of FIG. 15.

FIG. 17 is a sectional view of the box member taken along line 17-17 of FIG. 15.

INDEX TO REFERENCE NUMERALS IN DRAWINGS

Figure 1:
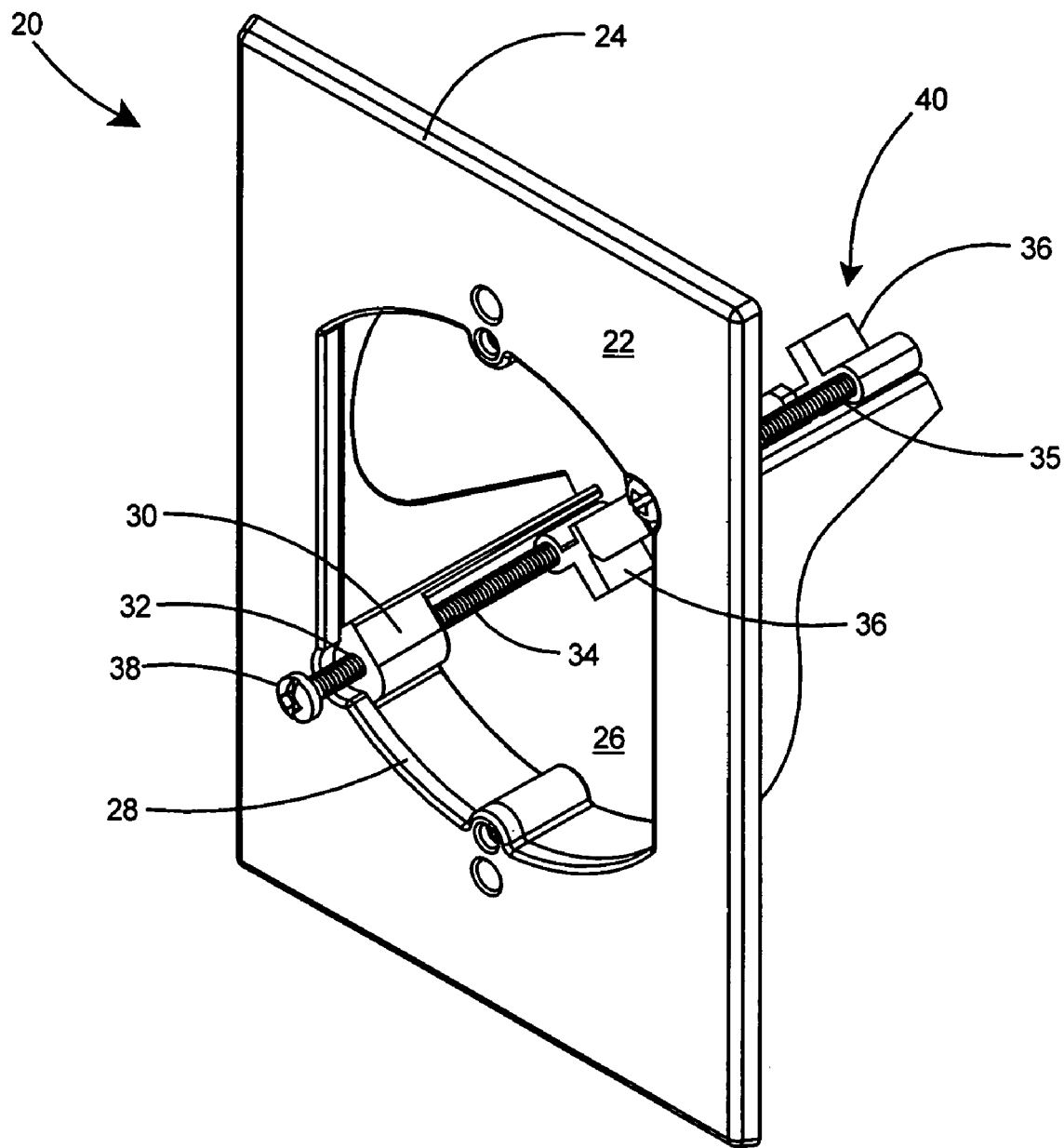
FIG. 1 is a front perspective view of a first embodiment of an electrical mounting device according to the present invention.

| | |
|---|---|
| 20 | electrical mounting device, first embodiment |
| 22 | front plate |
| 24 | contoured periphery |
| 26 | opening |
| 28 | inner periphery |
| 30 | mounting boss |
| 32 | oversize aperture |
| 34 | mounting fastener |
| 35 | end of mounting fastener |
| 36 | clamp arm |
| 38 | fastener head |
| 40 | retracted position of clamp arm |
| 42 | component boss |
| 44 | aperture |
| 46 | rear surface of plate |
| 48 | sidewall |
| 50 | L-shaped post |
| 52 | frame member |
| 54 | extended position of clamp arm |
| 55 | base portion of clamp arm |
| 56 | stem portion of clamp arm |
| 57 | first edge |
| 58 | tab |
| 59 | bore through base portion of clamp arm |
| 60 | directional arrow |
| 61 | second edge |
| 62 | wall |
| 64 | hole in wall |
| 66 | sheetrock |
| 67 | low voltage electrical component |
| 68 | rear surface of sheetrock |
| 69 | fastener |
| 70 | electrical mounting device, second embodiment |
| 72 | rear wall |
| 73 | longitudinal axis |
| 74 | electrical box |
| 75 | lateral axis |
| 76 | inner enclosure |
| 77 | opposing ends of front opening |
| 78 | recessed area of sidewall |
| 79 | first portion of recessed area |
| 80 | corner of sidewall |
| 81 | second portion of recessed area |
| 82 | shallow recess of sidewall |
| 84 | circular portion of sidewall |
| 86 | knockout portion |
| 88 | channel |
| 90 | bore in component boss |
| 92 | diameter of hole in wall |
| 94 | second edge |
| 96 | electrical fitting |
| 98 | flat front portion of clamp arm |
| 99 | high voltage electrical component |
| 100 | faceplate |
| 101 | fastener |
| $\Theta 1$ | total angle of rotation of the clamp arm in first embodiment |
| $\Theta 2$ | total angle of rotation of the clamp arm in second embodiment |
| D1 | outer diameter or outer periphery of circular peripheral wall |
| D2 | second diameter or diameter at which first edge is located |
| D3 | diameter of hole in wall created by hole-saw |

DETAILED DESCRIPTION OF THE INVENTION

There are presented herein two embodiments of an electrical mounting device, each of which significantly reduces the amount of time required to install an electrical component or electrical fixture on a wall. A first embodiment of the electrical mounting device 20 (see FIG. 1), provides a mounting device for mounting a low voltage electrical component on a wall. A second embodiment of the electrical mounting device 100 (see FIG. 12), provides a mounting device for mounting a high voltage electrical component, such as a duplex receptacle or a switch, or an electrical fixture, such as a light fixture, on a wall. Conventional electrical mounting devices, such as the conventional LV1 single gang retro low voltage bracket, include wings that extend beyond the outer periphery of the LV1 frame. The wings cannot be retracted within the periphery of the frame. Thus, installation of the LV1 requires cutting a central hole, either rectangular or round in shape, in the drywall and then making additional cuts to accommodate the passage of the wings through the drywall. Mounting the LV1 on a wall therefore requires 10 to 12 minutes as a result of the time required to prepare a hole that will accommodate the non retractable wings. Conventional high voltage electrical boxes also include non retractable wings, therefore requiring a mounting time that is about the same as the LV1. By providing retractable clamp arms that are arranged to retract within the perimeter of a standard size hole-saw, the electrical mounting devices of the present invention can be mounted to a wall that is prepped with only a single cut by a hole saw, thereby reducing the mounting time to 20 to 30 seconds and offering significant time savings as compared to the installation of conventional LV1 type devices.

As shown in FIG. 1, the first embodiment of an electrical mounting device 20 according to the present invention includes a front plate 22 having a contoured periphery 24 and an opening 26 with an inner periphery 28. Two mounting bosses 30, integral with the plate 22, are provided along the inner periphery 28. The mounting bosses 30 include oversize apertures 32 therein. Substantially long mounting fasteners 34 include ends 35 that extend through the oversize apertures 32 in the mounting bosses 30 and each mounting fastener 34 includes a clamp arm 36 secured rigidly to the end 35 of the fastener 34. Thus each mounting fastener 34 can be easily rotated within its oversize aperture 32 as desired by turning the head 38 of the respective fastener 34 with an appropriate tool such as a screwdriver (not shown). Each clamp arm 36 can therefore be rotated between an extended position and retracted position 40 as desired. FIG. 1 depicts the clamp arms 36 in the retracted position 40.

Figure 2:
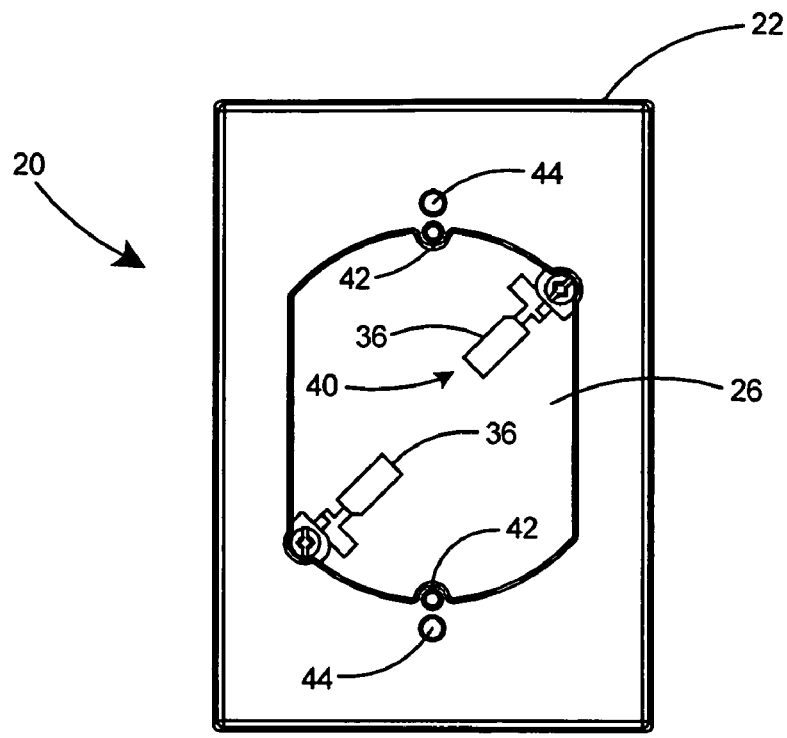
FIG. 2 is a front view of the electrical mounting device or frame of FIG. 1, with the clamp arms rotated to a retracted position.
Figure 3:
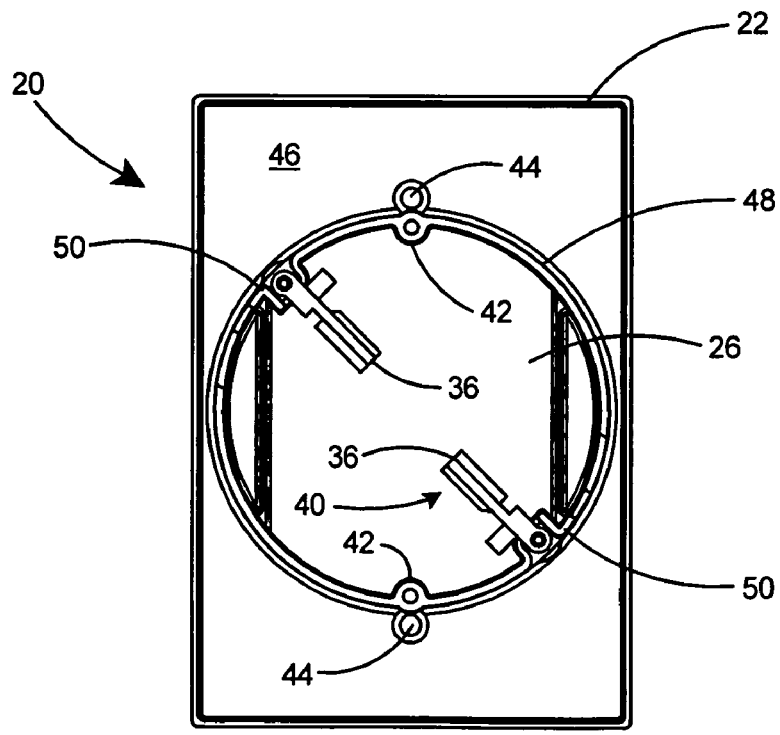
FIG. 3 is a rear view of the electrical mounting device of FIG. 1.

With reference to FIGS. 2 and 3, which depict the clamp arms 36 in the retracted position 40, the electrical mounting device 20 further includes component bosses 42 along the inner periphery 28 of the opening 26 and apertures 44 for the connection of electrical fixtures (not shown). As shown in FIG. 3, the rear surface 46 of the plate 22 includes a sidewall 48. Two L-shaped posts 50 extend rearward from the sidewall 48 immediately adjacent to each mounting boss 30. As shown in FIG. 3, with the clamp arms 36 rotated to their retracted position 40, the clamp arms 36 are confined completely within the perimeter of the sidewall 48.

Figure 4:
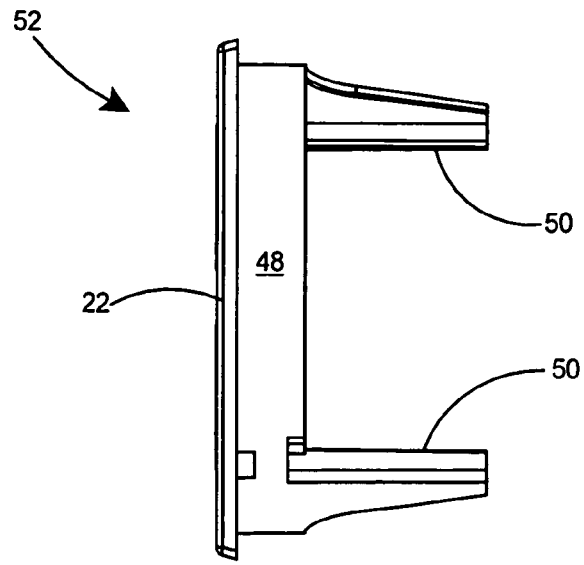
FIG. 4 is a front view of the electrical mounting device or frame of FIG. 1, with the clamp arms rotated to an extended position.
Figure 5A:
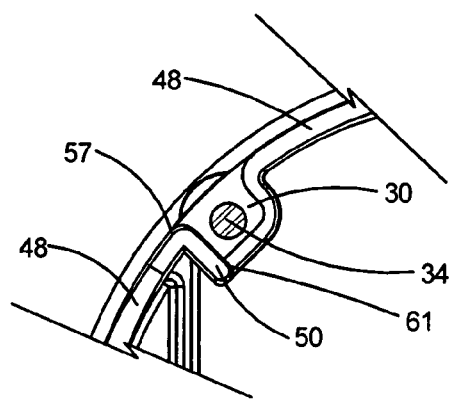
FIG. 5A is a detail of a portion of the circular peripheral wall and L-shaped post on the rear side of the electrical mounting device of FIG. 5.
Figure 5:
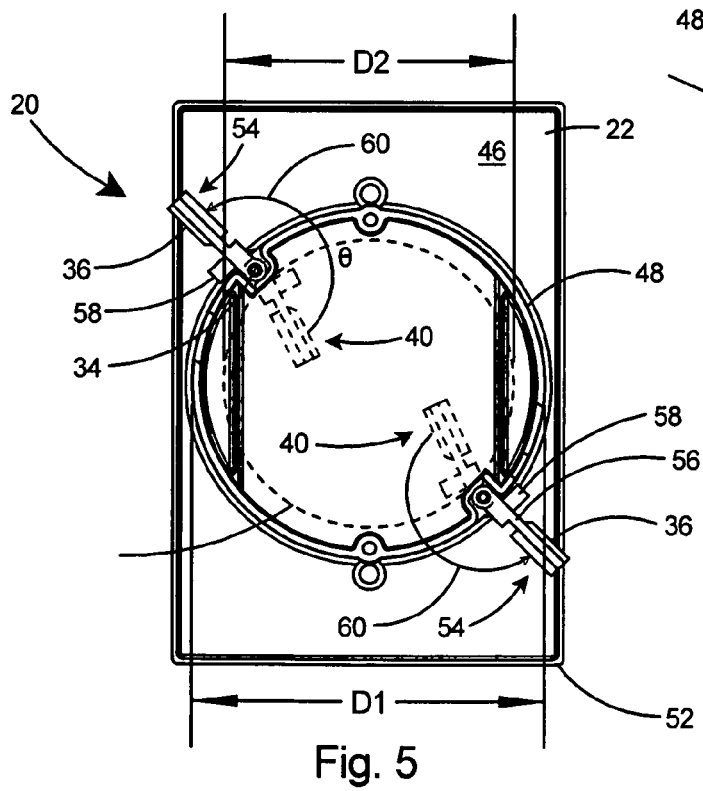
FIG. 5 is a sectional view of the electrical mounting device taken along line 5-5 of FIG. 4.

Referring to FIGS. 4-5A, two L-shaped posts 50 extend from the sidewall 48. As shown in FIG. 4, the front plate 22, sidewall 48, and posts 50 together form a low voltage frame member 52. The frame member 52 is typically molded in one-piece of plastic. As shown in FIG. 5, the clamp arms 36 can be rotated from the retracted position 40 to an extended position 54, or vice versa, by turning mounting fastener 34. Each clamp arm 36 includes a base portion 55, a stem portion 56 and an outward extending tab 58. Base portion 55 of clamp arm 36 includes a bore 59 therein through which the mounting fastener will extend. As the clamp arm is rotated fully in the direction of arrow 60 in FIG. 5, the tab 58 engages the L-shaped post 50 and stops the travel of the clamp arm 36 thereby positioning the clamp arm 36 in the extended position 54. If the clamp arm 36 is rotated fully in the direction opposite of arrow 60, the stem 56 of the clamp arm 36 engages a first edge 57 on L-shaped post 50 thereby positioning the clamp arm 36 in the retracted position 40. Circular sidewall 48 of electrical mounting device 20 includes an outer periphery or outer diameter D1. As shown in FIG. 5, the first edge 57 is at a second diameter D2, which is a smaller diameter than the outer periphery D1 of the sidewall 48, and first edge 57 positions the clamp arms 36 in the retracted position 40 thereby retracting all portions of the clamp arms 36 within the outer periphery D1 of the sidewall 48. The total angle of rotation Θ1 of the clamp arm 36 from the retracted position 40 to the extended position 54 is 198°. The two clamp arms 36 are situated at 180° apart on opposite sides of the sidewall 48. As viewed from the front side of the front plate 22, rotation of the clamp arms 36 fully counterclockwise will position the clamp arms 36 in the retracted position 40 and rotation of the clamp arms 36 fully clockwise will position the clamp arms 36 in the extended position 54. As shown in FIG. 5A, the L-shaped post 50 is located along the sidewall 48 immediately adjacent to the mounting boss 30 through which the mounting fastener 34 extends. A second edge 61 is provided on each L-shaped post 50 to stop the rotation of the clamp arm 36 when it is fully turned clockwise to the extended position 54 and thus properly position the clamp arm 36 behind the sheetrock.

Figure 6:
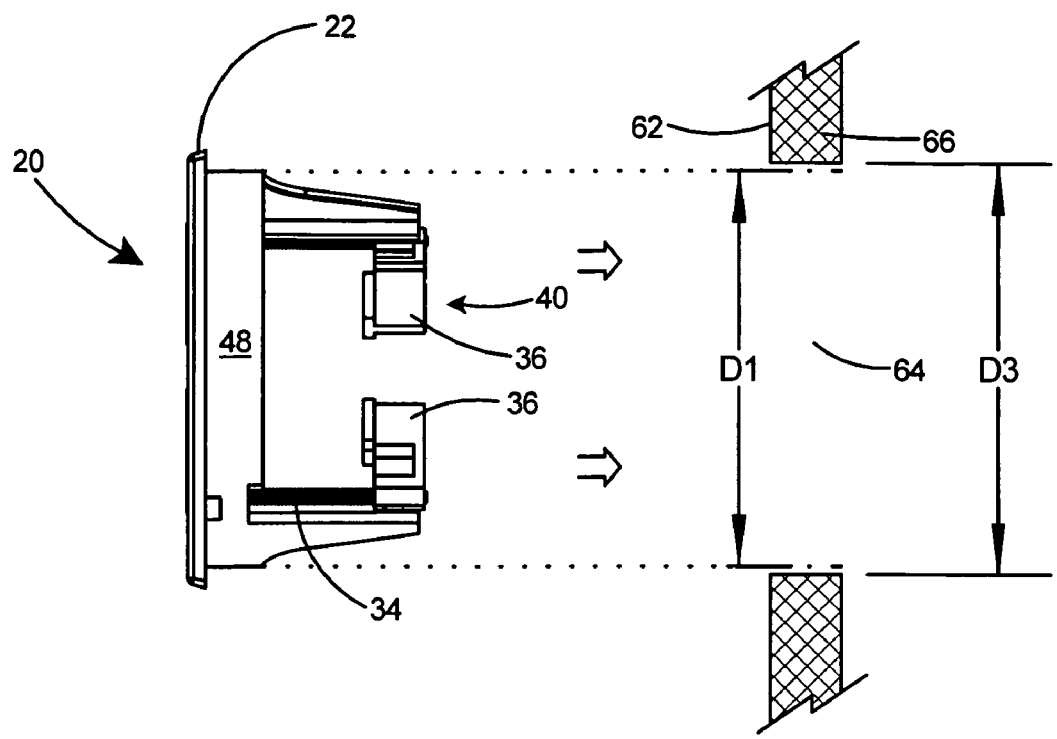
FIG. 6 is a side view of the first embodiment of the electrical mounting device in alignment with a hole in a wall and with the clamp arms retracted.
Figure 7:
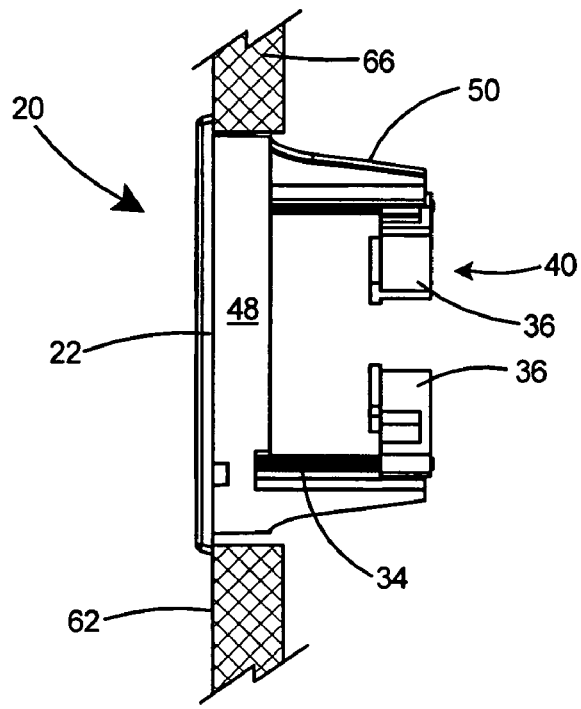
FIG. 7 is a side view of the electrical mounting device of FIG. 6 after it has been inserted into the wall.
Figure 8:
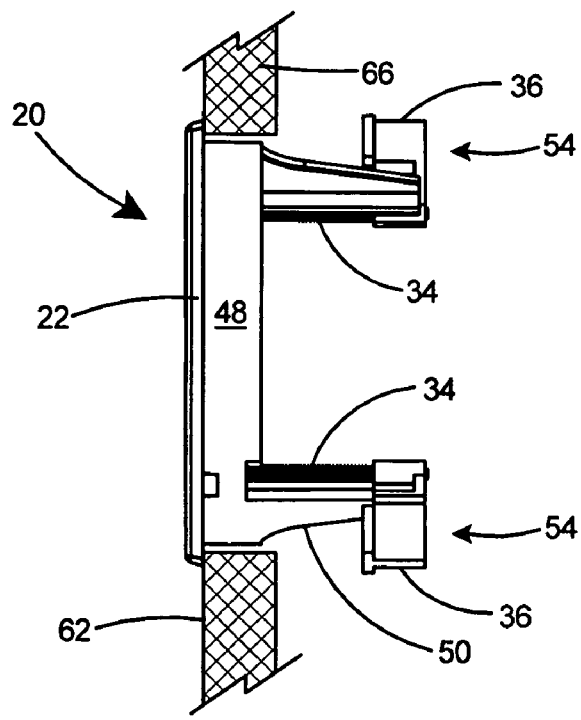
FIG. 8 is a side view of the electrical mounting device of FIG. 7 after the clamp arms have been rotated to the extended position.
Figure 9:
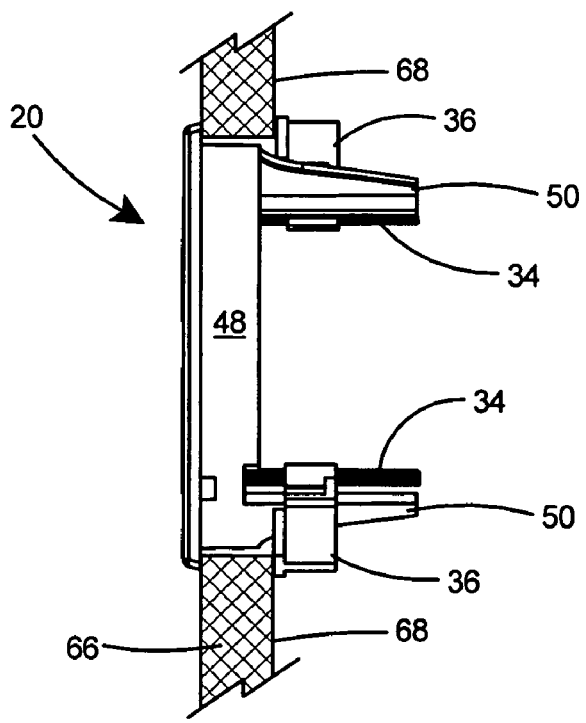
FIG. 9 is a side view of the electrical mounting device of FIG. 8 after the clamp arms have been tightened to secure the frame to the wall.

Referring to FIGS. 6-9, there are shown a sequence of figures that illustrate the operation of the first embodiment of the electrical mounting device 20 of the present invention. For securing the electrical mounting device 20 to a wall 62, an installer simply makes a hole 64 in the sheetrock 66 using a standard hole-saw (not shown) of the proper size. As an example, for an electrical mounting device 20 with a sidewall 48 having an outer periphery or outer diameter D1 of 3.49 inch, a standard 3.5 inch hole-saw is used to create a hole 64 of diameter D3 in the sheetrock 66. To install the electrical mounting device 20, the clamp arms 36 are first rotated to the retracted position 40 as shown in FIG. 6. The mounting device 20 is then inserted into hole 64 until the front plate 22 contacts and is flush against the wall 62 as shown in FIG. 7. The clamp arms 36 are then rotated to the extended position 54, as shown in FIG. 8, by turning the mounting fasteners 34 clockwise. Continued rotation of the mounting fasteners 34 in the clockwise direction will draw clamp arms 36 against the rear surface 68 of the sheetrock 66 as shown in FIG. 9, thereby securing the electrical mounting device 20 to the wall 62. The entire sequence of drilling the hole 64 and installing the electrical mounting device 20 of the present invention requires only 20 to 30 seconds thereby offering significant time savings as compared to the installation of conventional LV1 type devices which typically take 10 to 12 minutes to install as a result of the extensive wall preparation that is required.

Figure 10:
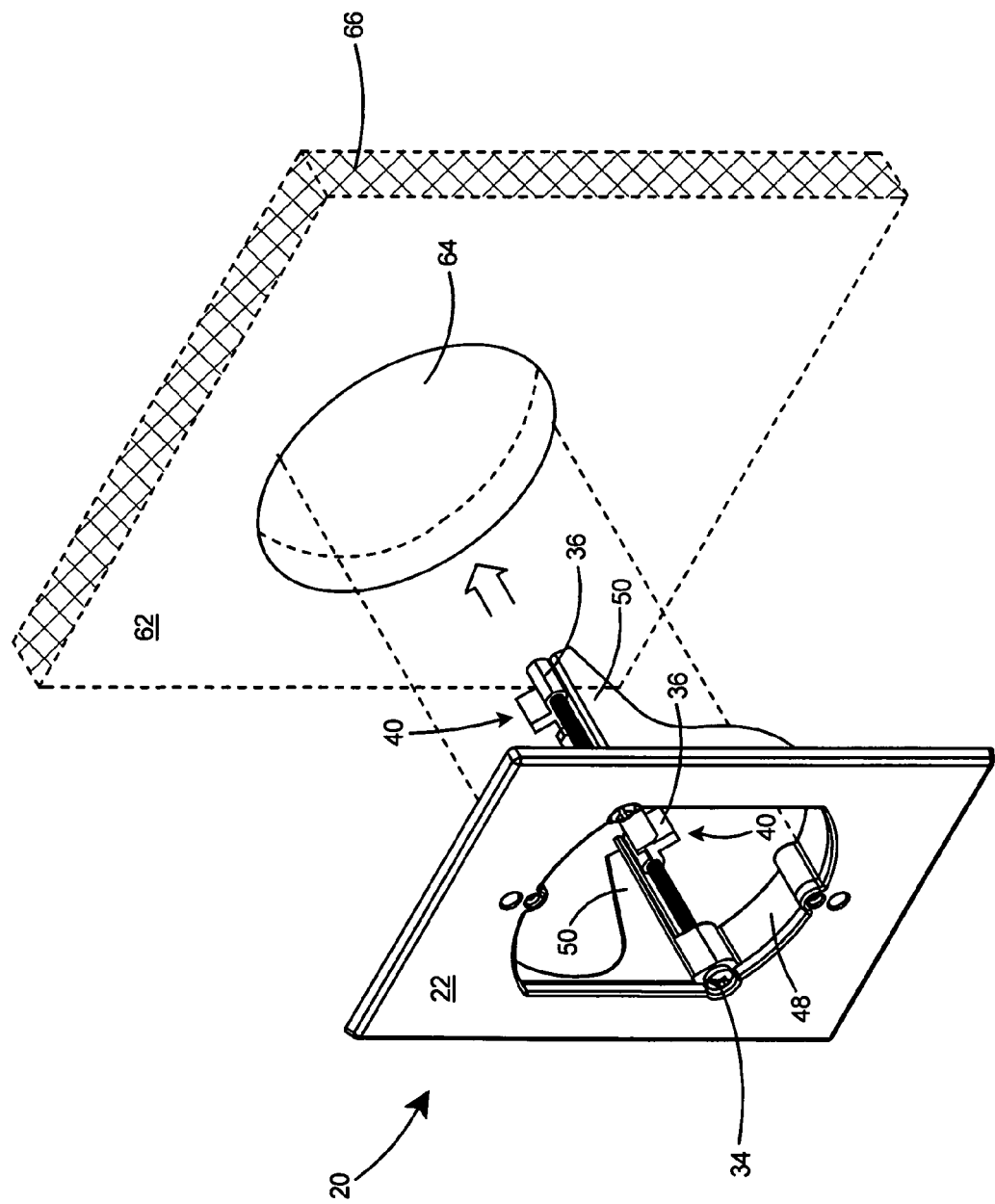
FIG. 10 is a perspective view of the first embodiment of the electrical mounting device in alignment to be inserted into a hole in a wall.
Figure 11:
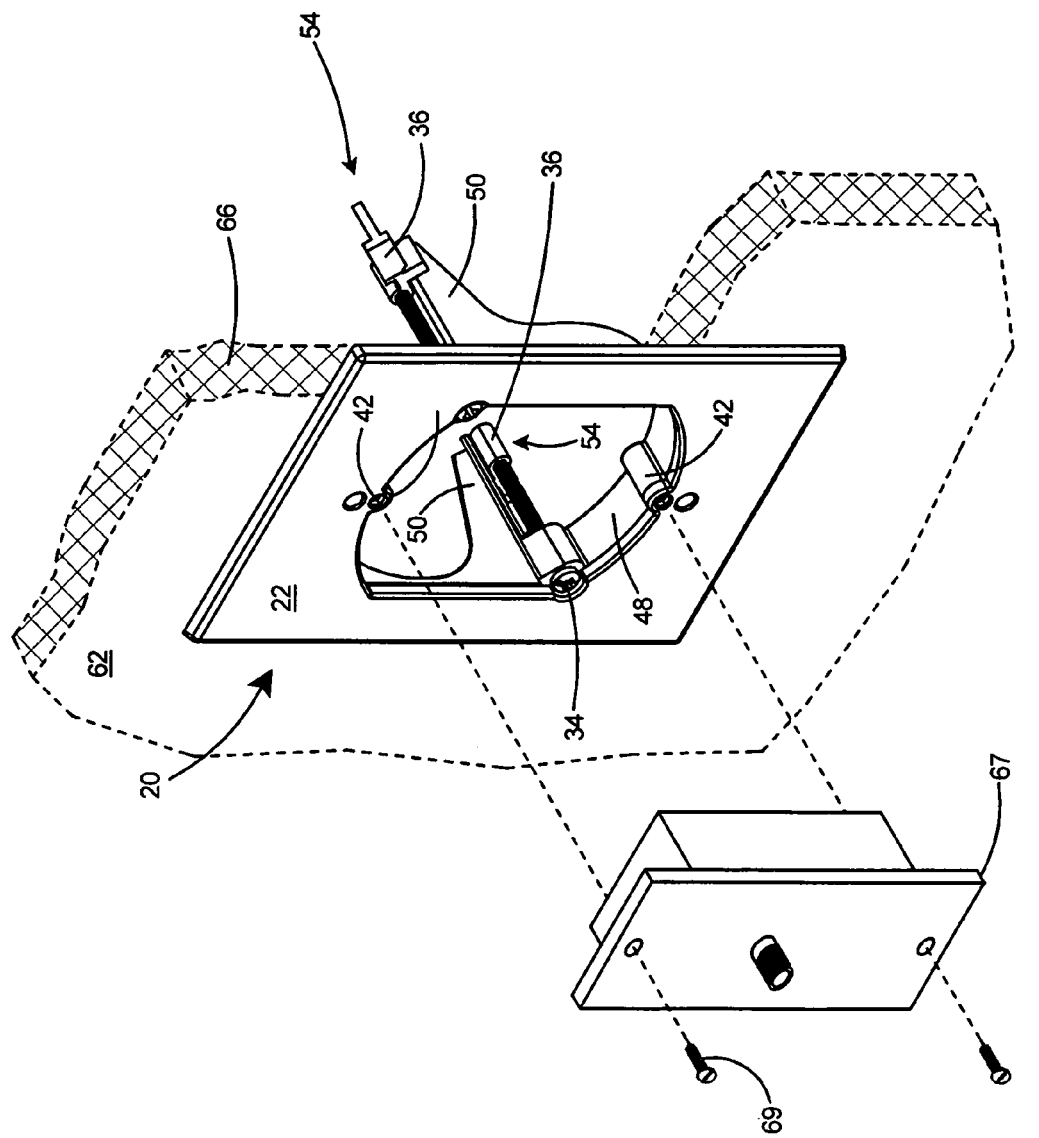
FIG. 11 is a perspective view of the electrical mounting device of FIG. 10 and a portion of the surrounding wall after the mounting device is secured to the wall and with an electrical component in alignment to be secured to the mounting device.

FIGS. 10 and 11 also depict the operation of the first embodiment of the electrical mounting device 20. FIG. 10 depicts the electrical mounting device 20 in alignment with a circular hole 64 created by a hole-saw (not shown) of the appropriate size. The clamp arms 36 are rotated fully counterclockwise to the retracted position 40 which places them inside the periphery of the sidewall 48. FIG. 11 depicts the electrical mounting device 20 after it has been placed flush against a wall 62 and with the clamp arms 36 rotated clockwise to the extended position which locates the clamp arms 36 outward of the sidewall 48 and behind the wall 62. A portion of the wall 62 has been cut away to show details of the electrical mounting device. A low voltage electrical component 67 is in alignment with the opening 26 in the plate 22 of the electrical mounting device 20 to be secured thereto by fasteners 69 secured into the component bosses 42.

Figure 12:
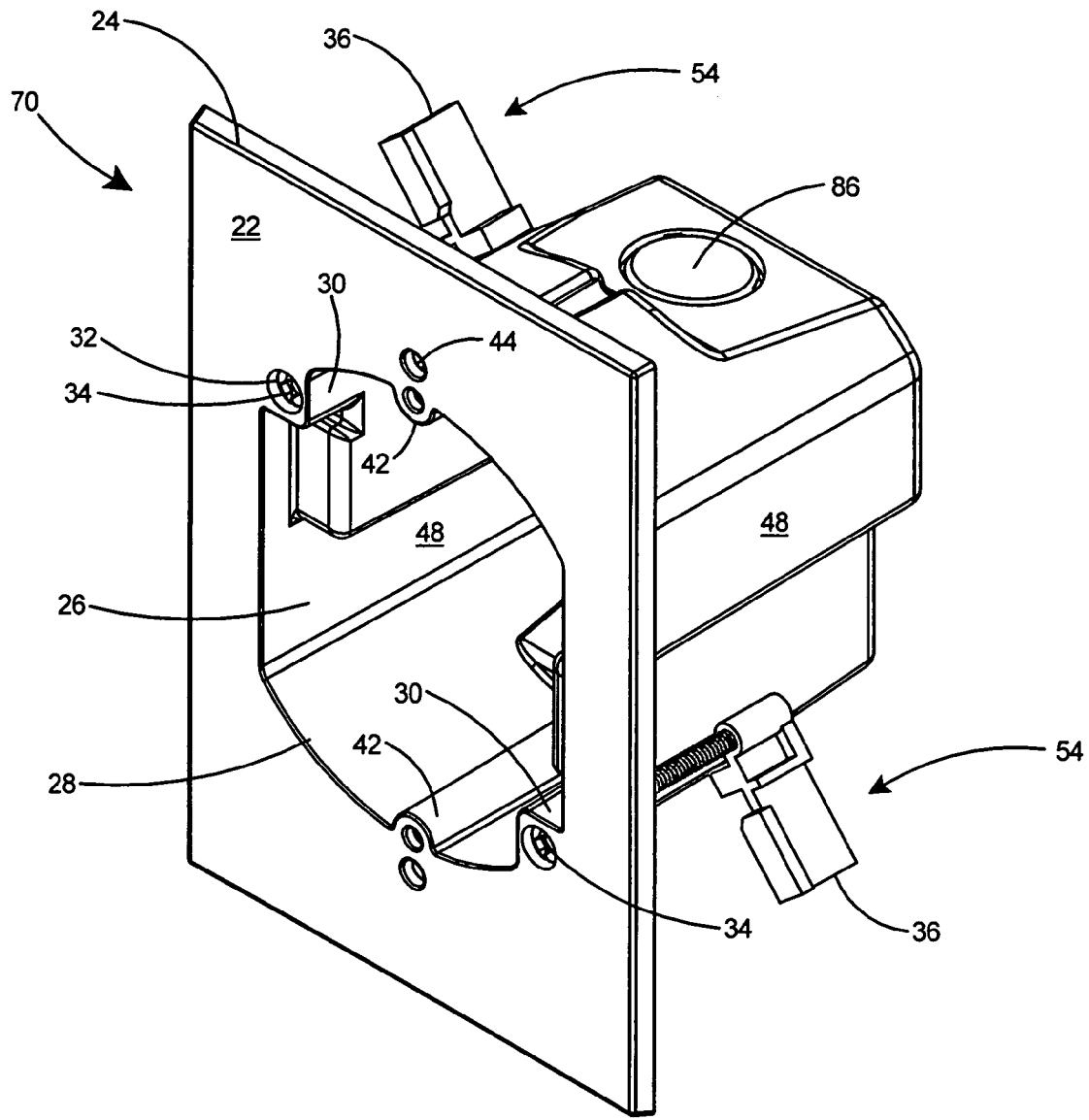
FIG. 12 is a front perspective view of a second embodiment of an electrical mounting device according to the present invention with the clamp arms extended.

With reference to FIG. 12, there is shown a second embodiment of an electrical mounting device 70 according to the present invention. The second embodiment of the electrical mounting device 70 includes many of the same elements as the first embodiment, including a front plate 22 with contoured periphery 24, opening 26 with an inner periphery 28, and two mounting bosses 30 along the inner periphery 28 that are integral with the plate 22. Substantially long mounting fasteners 34 extend through oversize apertures 32 in the mounting bosses 30 and each mounting fastener 34 includes a clamp arm 36 secured rigidly to the end of the fastener 34. Thus each mounting fastener 34 can be easily rotated within its oversize aperture 32 as desired by turning the head 38 of the respective fastener 34 with an appropriate tool such as a screwdriver (not shown). Each clamp arm 36 can therefore be rotated between an extended position and retracted position as desired. FIG. 12 depicts the clamp arms 36 in the extended position 54.

Figure 13:
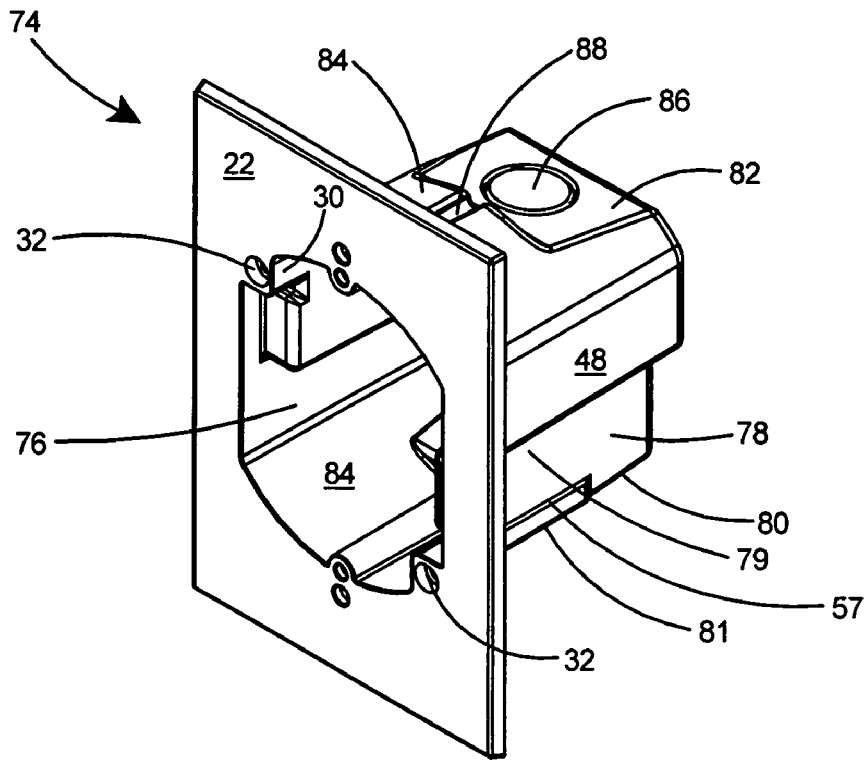
FIG. 13 is a front perspective view a box member that forms a portion of the electrical mounting device of FIG. 12.
Figure 14:
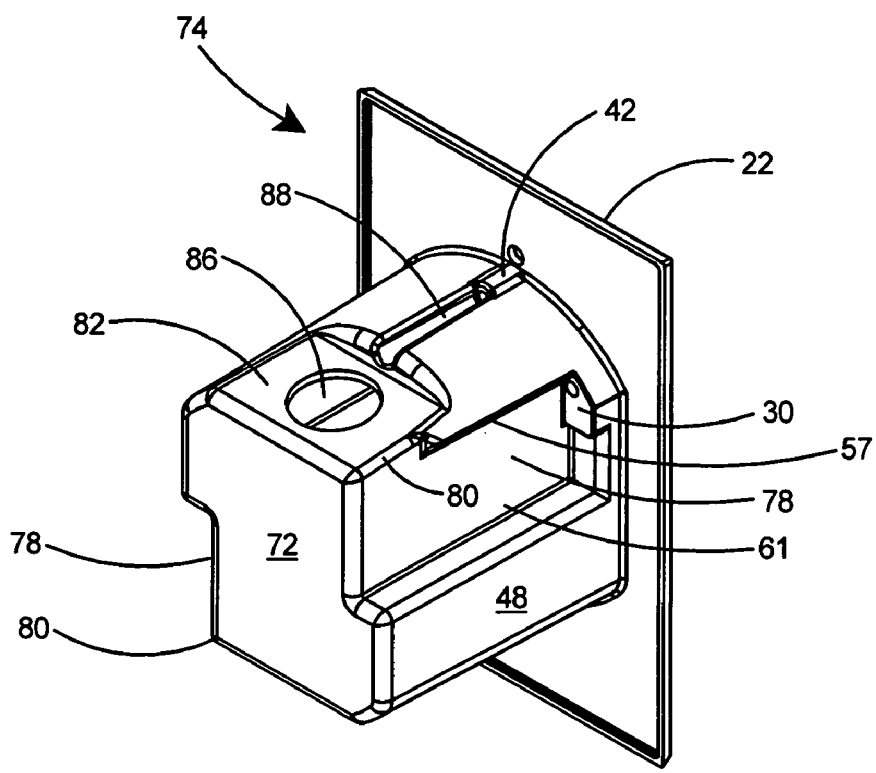
FIG. 14 is a rear perspective of the box member of FIG. 13.

Referring to FIGS. 13 and 14, the front plate 22 and sidewall 48 are closed by a rear wall 72 to form an electrical box 74 with an inner enclosure 76. The electrical box 74 portion of the second embodiment of the electrical mounting device may be constructed of metal or plastic but is most preferably molded in one piece of plastic. As for the first embodiment, the sidewall 48 of the second embodiment of the electrical mounting device is substantially circular in shape and all portions of the sidewall 48 are sized to fit within the inner periphery of a standard size hole-saw (not shown). The sidewall 48 includes recessed areas 78 on opposing corners 80 of the sidewall 48. The first edge 57 for stopping the counterclockwise rotation of clamp arm 36 is on a first portion 79 of recessed area 78 and the second edge 61 for stopping the clockwise rotation of clamp arm 36 is on a second portion 81 of recessed area 78. Shallow recessed areas 82 on the circular portion 84 of the sidewall 48 include knockout portions 86. The circular portion 84 of the sidewall 48 includes a channel 88 extending rearward from each of the component bosses 42. All portions of the sidewall 48 including the circular sidewall portion 84 sized to fit within the inner periphery of a standard size hole-saw.

With reference to FIGS. 15-17, the component bosses 42 include bores 90 therein for acceptance of screws (not shown) for connecting high voltage components such as duplex receptacles, switches or the like. As shown in FIG. 15, the entire sidewall 48 of the electrical box 74 is dimensioned and shaped to fit within the diameter 92 of the hole created by the standard size hole-saw that it is used in conjunction with. As shown in FIGS. 16 and 17, the sidewall 48 and rear wall 72 define a spacious inner enclosure 76 for accepting an electrical component therein. As shown in FIG. 15, the plate 22 includes a longitudinal axis 73 and a lateral axis 75 and the component bosses 42 are preferably located at opposing ends 77 of the plate opening 26 along the longitudinal axis 73.

Figure 18:
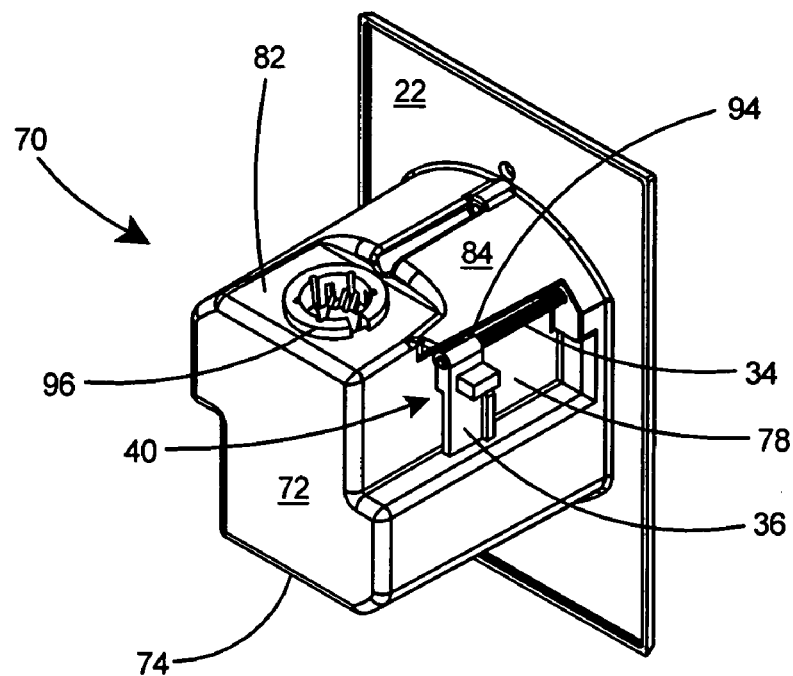
FIG. 18 is a rear perspective view of the second embodiment of the electrical mounting device with the clamp arms in the retracted position.
Figure 19:
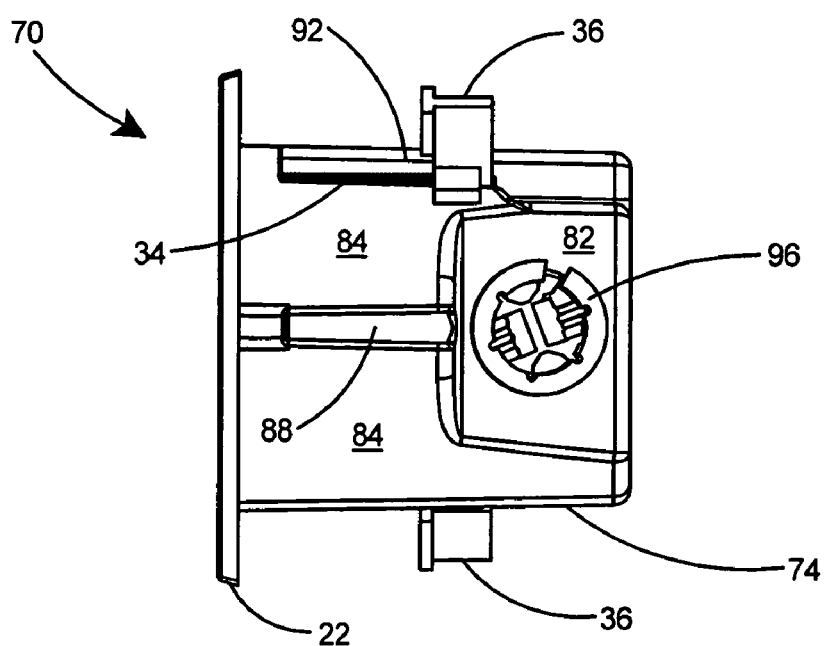
FIG. 19 is a top view of the second embodiment of the electrical mounting device with the clamp arms in the extended position.

Referring to FIGS. 18 and 19, when in the retracted position 40, the clamp arms 36 are recessed within the recessed area 78 of the sidewall 48. The second embodiment of the electrical mounting device 70 includes a second edge 94 which will serve to stop the clockwise advancement of the mounting fastener 34 and position the clamp arm 36 in the extended position (not shown). The shallow recess 82 in the sidewall 48 of the electrical box 74 can include an electrical fitting 96 therein that has been inserted in a knockout aperture 86. An electrical fitting 96 such as the "BLACK BUTTON™" connector available from Arlington Industries, Inc., of Scranton, Pa., can be inserted within the aperture, frictionally held therein as shown. The "BLACK BUTTON™" connector is disclosed in U.S. Pat. No. 5,693,910, the entire contents of which are incorporated herein by reference.

Figure 20:
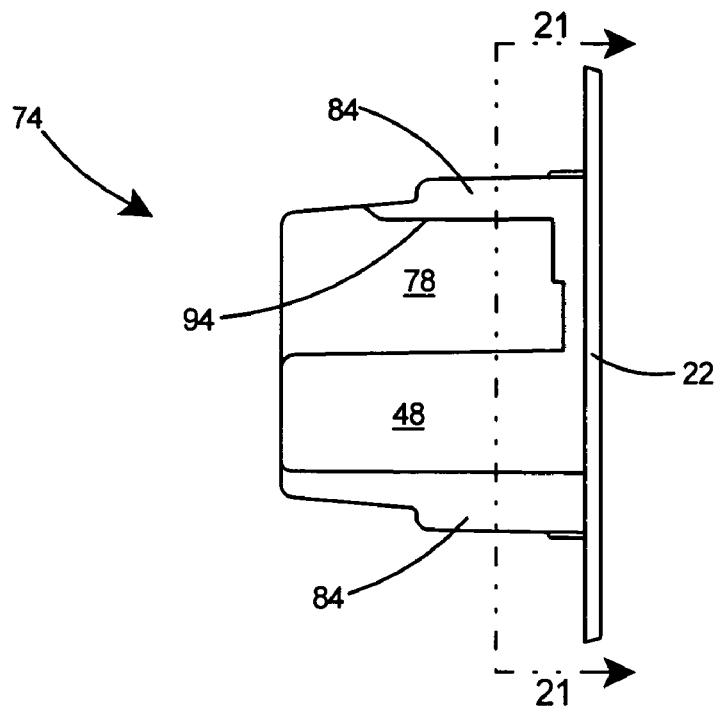
FIG. 20 is a side view of the electrical box of FIG. 13.
Figure 21:
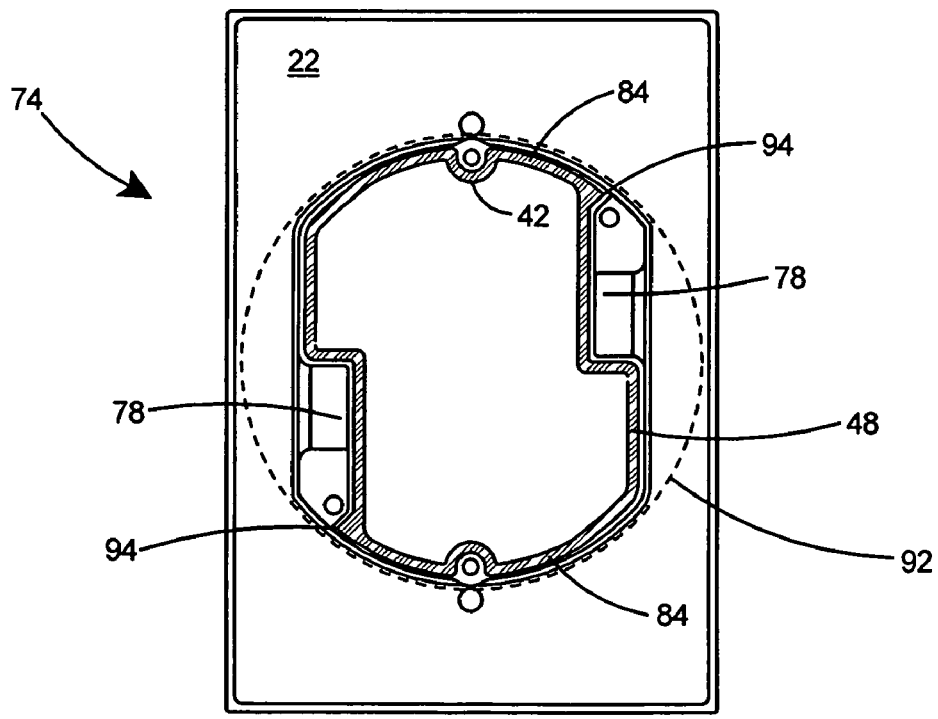
FIG. 21 is a sectional view of the electrical box taken along line 21-21 of FIG. 20.

With reference to FIGS. 20 and 21, the sidewall 48 of the electrical box 74 including circular wall portion 84 and recessed areas 78 are confined within the diameter of a hole formed by a standard size hole-saw (not shown), as denoted by dashed line 92 in FIG. 21. As shown in FIG. 21, the second edge 94 is an integral extension from the recessed area 78 of the sidewall 48.

Figure 22:
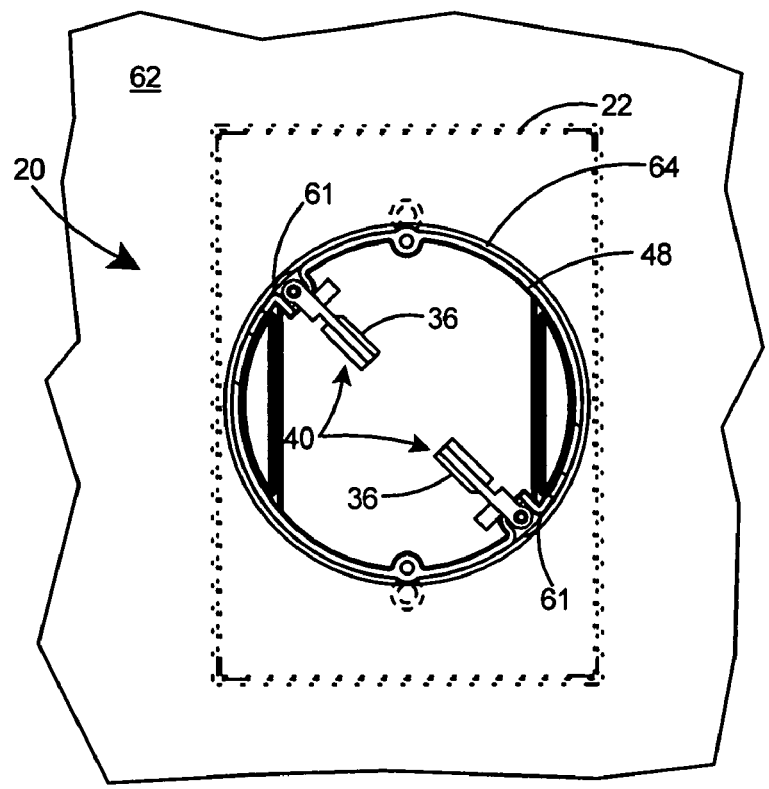
FIG. 22 is a rear view of a wall portion and the first embodiment of the electrical mounting device after the retracted clamp arms and rearward extending peripheral wall have been inserted through the hole in the wall.
Figure 23:
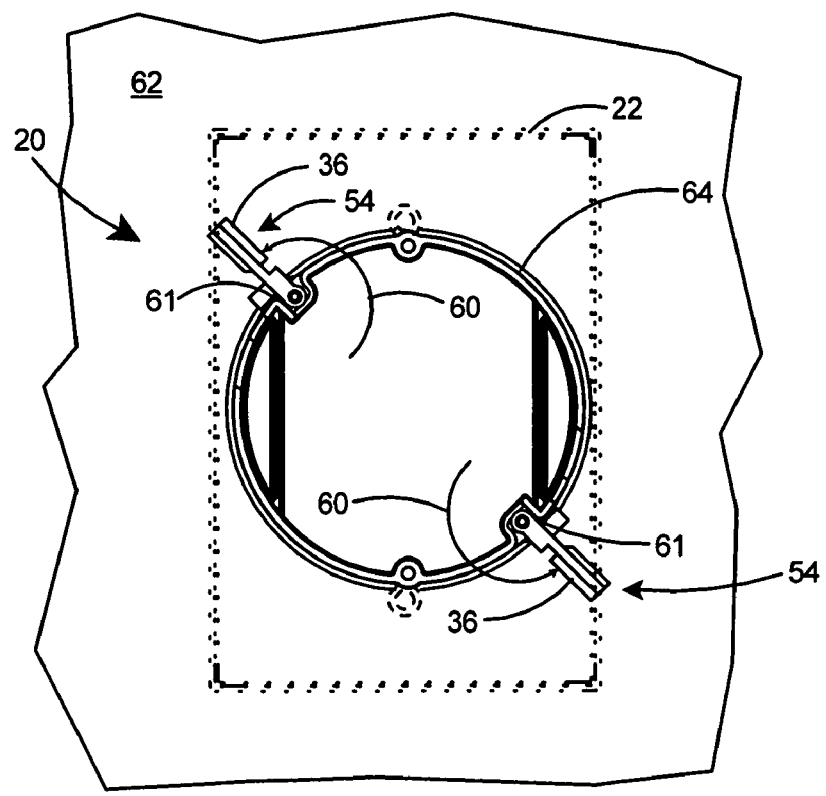
FIG. 23 is a rear view of the wall portion of FIG. 20 and the first embodiment of the electrical mounting device with the clamp arms extended.

FIGS. 22 and 23 depict the first embodiment of the electrical mounting device 20 mounted in a hole 64 in the wall 62. For inserting the electrical mounting device 20 through the hole 64 in the wall 62, clamp arms 36 are rotated to the retracted position 40, as shown in FIG. 22. Thus all portions of the electrical mounting device 20 extending rearward from the front plate 22 can slip easily through the wall opening 64 created by the hole-saw. After being inserted through the opening 64, the clamp arms 36 are rotated clockwise (as viewed from the front of the mounting device) (see directional arrow 60) until contacting second edge 61, which positions the clamp arms 36 in the extended position 54 as shown in FIG. 23. The clamp arms 36 in the extended position 54 are thus ready to be tightened against wall 62 to secure the electrical mounting device 20 to the wall.

Figure 24:
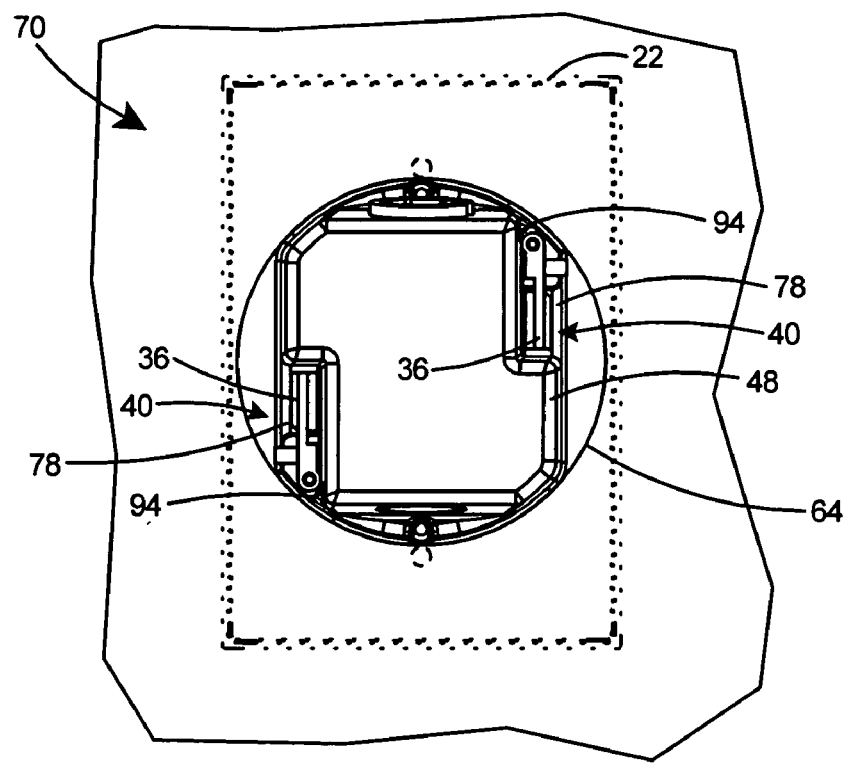
FIG. 24 is a rear view of a wall portion and the second embodiment of the electrical mounting device after the retracted clamp arms and rearward extending peripheral wall have been inserted through the hole in the wall.
Figure 25:
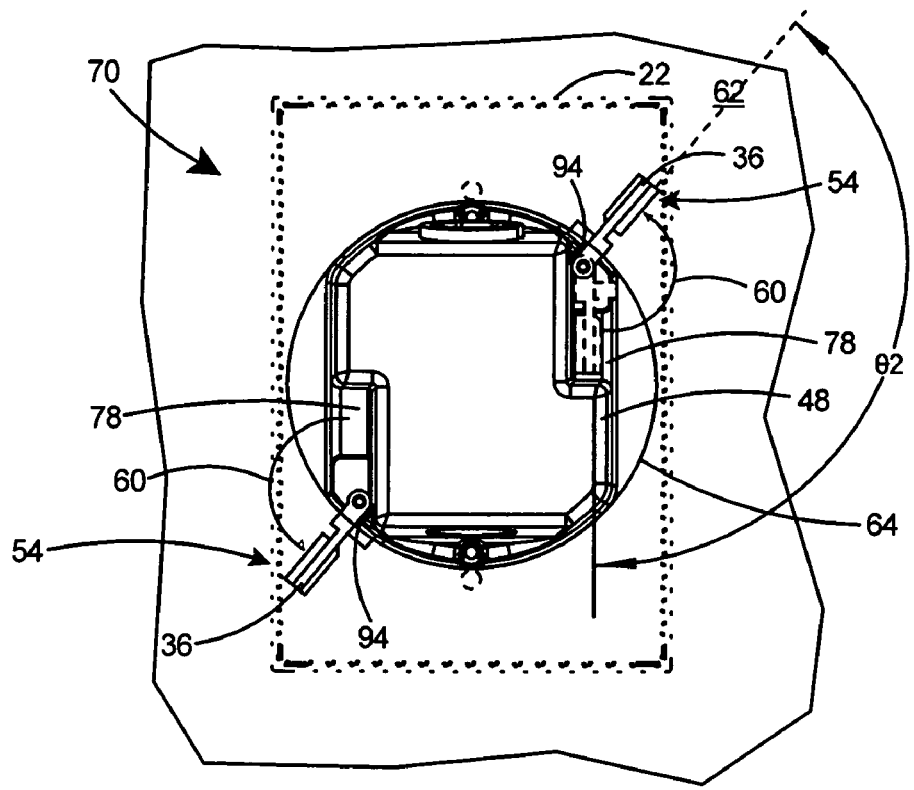
FIG. 25 is a rear view of the wall portion of FIG. 22 and the second embodiment of the electrical mounting device with the clamp arms extended.

FIGS. 24 and 25 depict the second embodiment of the electrical mounting device 70 mounted in a hole 64 in the wall 62. For inserting the electrical mounting device 20 through the hole 64 in the wall 62, clamp arms 36 are rotated to the retracted position 40, as shown in FIG. 24. All portions of the electrical mounting device 70 extending rearward from the front plate 22 can slip easily through the wall opening 64 created by the hole-saw. After being inserted through the opening 64, the clamp arms 36 are rotated clockwise through angle $\Theta 2$ (as viewed from the front of the mounting device) (see directional arrow 60) until contacting second edge 94, which positions the clamp arms 36 in the extended position 54 as shown in FIG. 25. The clamp arms 36 in the extended position 54 are thus ready to be tightened against wall 62 to secure the electrical mounting device 70 to the wall. The total angle $\Theta 2$ of rotation of the clamp arm 36 for the second embodiment of the electrical mounting device 70 is most preferably 140°. Preferably, for both embodiments of the present invention, the total angle of rotation of the clamp arms 36 between the retracted and extended positions is between 130 and 210 degrees.

Figure 26:
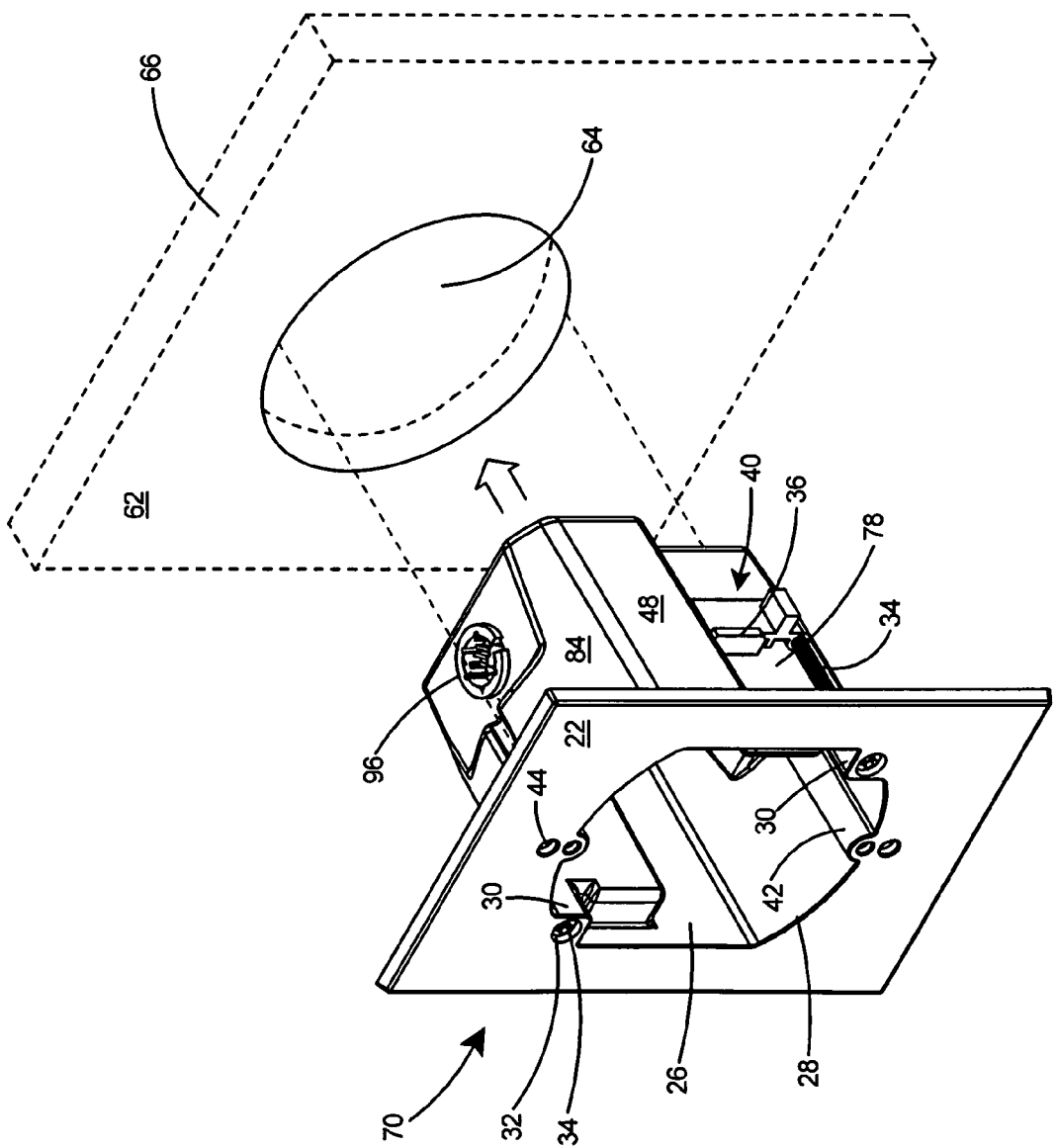
FIG. 26 is a perspective view of the second embodiment of the electrical mounting device in alignment with a hole in a wall and with the clamp arms retracted.

With reference to FIG. 26, in order to prepare the electrical mounting device 70 for insertion through the hole 64, the clamp arms 36 are each rotated counterclockwise to the retracted position 40 thereby positioning all portions of the clamp arm 36 within a circle extending through the circular portion 84 of the sidewall 48. Each clamp arm 36 includes a flat front portion 98 facing the rear surface of the plate 22.

Figure 27:
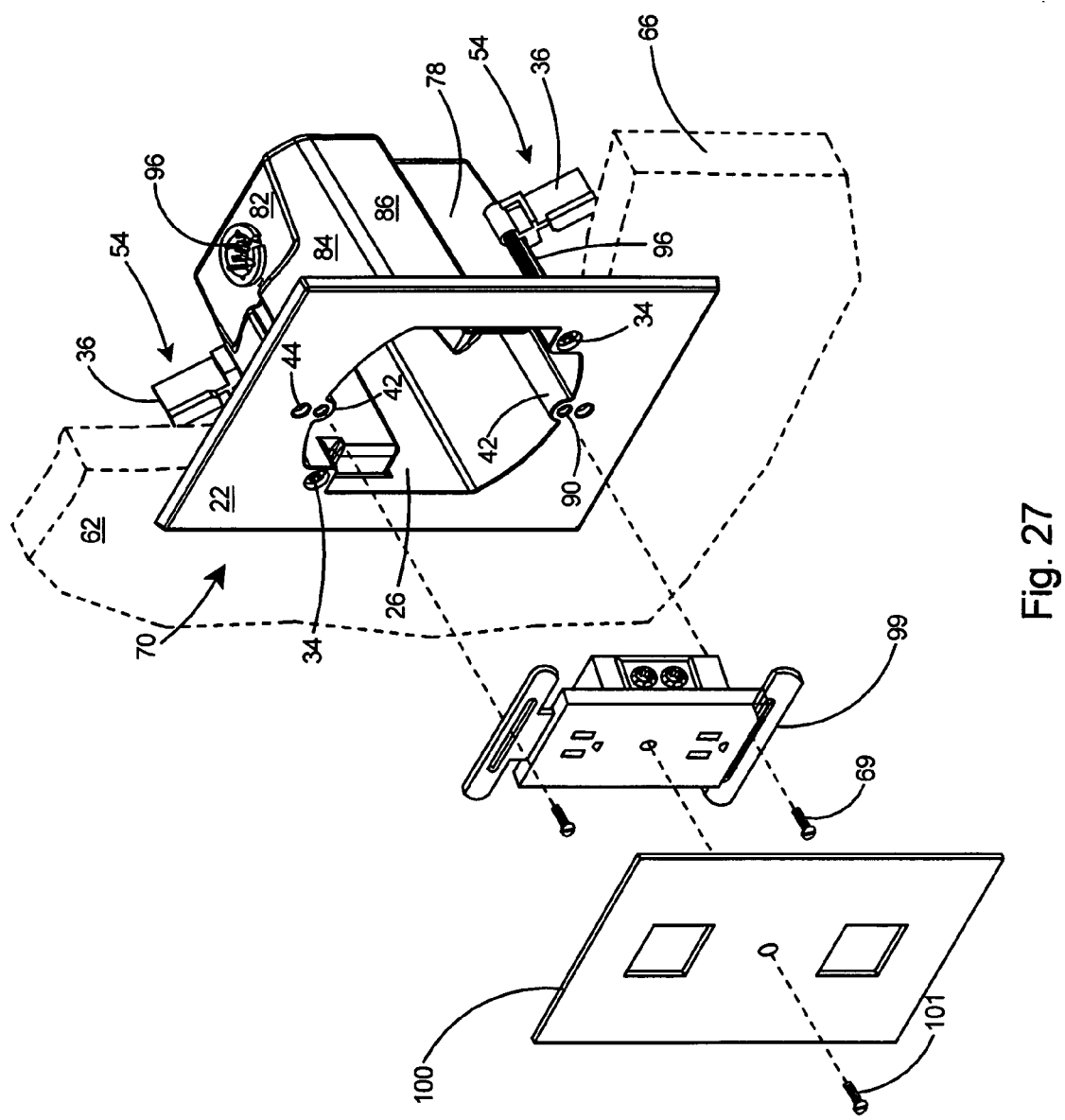
FIG. 27 is a perspective view of the electrical mounting device of FIG. 24 and a portion of the surrounding wall after the mounting device is secured to the wall and with an electrical component in alignment to be secured to the mounting device.

With reference to FIG. 27, after being inserted through the circular hole created by the hole-saw, the mounting fasteners 34 are rotated fully clockwise until clamp arms 36 are in their extended positions 54 and rotation is continued until the flat front portions 98 of clamp arms 36 are drawn tightly against the sheetrock 66 thereby securing the electrical mounting device 70 tightly against the wall 62. A portion of the wall 62 has been cut away to show details of the electrical mounting device. A high voltage electrical component 99 is in alignment with the opening 26 in the plate 22 of the electrical mounting device 70 to be secured thereto by fasteners 69 secured into the component bosses 42. A conventional faceplate 100 is then secured to the installed electrical component 99 by fastener 101.

The electrical box 74 portion of the second embodiment of the electrical mounting device 70 of the present invention may be constructed of metal or plastic but is most preferably molded in one piece of plastic. The electrical box 74 can be molded of any suitable plastic including polycarbonate, polyvinylchloride, acrylonitrile butadienestyrene, or a polyolefin.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. An electrical mounting device for mounting an electrical component to a wall comprising:
   a plate including a rear surface and an opening therein;
   a sidewall extending rearward from said plate, said sidewall including an outer periphery;
   said sidewall includes a circular sidewall portion having an outer diameter and no portion of said sidewall extending beyond said outer diameter of said circular sidewall portion;
   a mounting fastener including an end extending through said plate, said mounting fastener capable of free rotation within said plate;
   a clamp arm rigidly secured to said end of said mounting fastener whereby said clamp arm rotates with rotation of said mounting fastener;
   a first edge on said sidewall for stopping the rotation of said clamp arm in a retracted position whereby said clamp arm is retracted within said outer periphery of said sidewall; and
   a second edge on said sidewall for stopping the rotation of said mounting fastener in an extended position whereby said clamp arm is extended outward of said outer periphery of said sidewall.

2. The electrical mounting device of claim 1 wherein
   said first edge is located at a second diameter;
   said second diameter is smaller than said outer diameter of said circular portion; and
   said first edge stopping counterclockwise rotation of said mounting fastener and positioning said clamp arm in said retracted position.

3. The electrical mounting device of claim 2 wherein
   said second edge is located at said outer diameter; and
   said second edge stopping clockwise rotation of said mounting fastener and positioning said clamp arm in said extended position.

4. The electrical mounting device of claim 1 including
   an inner periphery on said sidewall;
   a mounting boss integral with said inner periphery of said sidewall; and
   an oversize aperture in said mounting boss,
   whereby said mounting fastener extends through said oversize aperture.

5. The electrical mounting device of claim 1 including
   a post adjacent said mounting boss; and
   said post extending rearward from said sidewall.

6. The electrical mounting device of claim 5 wherein said post is substantially L-shaped and includes said first edge and said second edge.

7. The electrical mounting device of claim 6 wherein said plate, said sidewall, and said rearward extending post forms a low voltage frame member.

8. The electrical mounting device of claim 1 wherein said sidewall is closed by a rear wall creating an electrical enclosure therein.

9. The electrical mounting device of claim 8 wherein said plate, said sidewall, and said rear wall form an electrical box for the receipt of high voltage electrical components.

10. The electrical mounting device of claim 1 including
    a recessed area in said sidewall for accommodating said clamp arm in said retracted position;
    said first edge is on a first portion said recessed area of said sidewall; and
    said second edge is on a second portion said recessed area of said sidewall.

11. The electrical mounting device of claim 10 wherein said second edge is an integral extension extending outward from said recessed area of said sidewall.

12. The electrical mounting device of claim 1 including
    two of said mounting fasteners;
    said opening in said plate includes corners; and
    said mounting fasteners are located at opposing diagonal corners of said opening in said plate.

13. The electrical mounting device of claim 1 wherein said clamp arm includes
    a base portion with a bore therein;
    a stem portion extending from said base portion;
    a tab extending laterally from said stem portion; and
    a flat front portion.

14. The electrical mounting device of claim 13 wherein
    said clamp arm is connected to said mounting fastener at said base portion;
    said tab of said clamp arm engages said second edge of said sidewall for positioning said clamp arm in said extended position.

15. The electrical mounting device of claim 1 wherein said plate includes
    an inner periphery on said plate surrounding said opening; and
    two component bosses along said inner periphery of said opening.

16. The electrical mounting device of claim 15 wherein
    said opening in said plate includes a longitudinal axis and a lateral axis; and
    said component bosses are located at opposing sides along said longitudinal axis of said opening.

17. The electrical mounting device of claim 16 including a channel extending rearward from each of said component bosses along said circular portion of said sidewall.

* * * * *